(12) United States Patent
Baumann

(10) Patent No.: US 9,977,513 B1
(45) Date of Patent: May 22, 2018

(54) CONDUCTIVE OPTIC LENS FOR INTERACTION WITH CAPACITIVE TOUCH SCREEN TECHNOLOGY

(71) Applicant: Procreate Brands LLC, Ferndale, WA (US)

(72) Inventor: Scott Baumann, Anacortes, WA (US)

( * ) Notice: Subject to any disclaimer, the term of this patent is extended or adjusted under 35 U.S.C. 154(b) by 0 days. days.

(21) Appl. No.: 15/178,447

(22) Filed: Jun. 9, 2016

Related U.S. Application Data

(60) Provisional application No. 62/173,078, filed on Jun. 9, 2015.

(51) Int. Cl.
 *G06F 3/041* (2006.01)
 *G06F 3/044* (2006.01)
 *G06F 3/0354* (2013.01)
 *G06F 3/03* (2006.01)
 *G06F 3/042* (2006.01)
 *G02B 7/02* (2006.01)

(52) U.S. Cl.
 CPC ............ *G06F 3/0304* (2013.01); *G02B 7/02* (2013.01); *G06F 3/0416* (2013.01); *G06F 3/0421* (2013.01); *G06F 3/044* (2013.01); *G06F 2203/04106* (2013.01); *G06F 2203/04108* (2013.01)

(58) Field of Classification Search
 CPC .... G06F 3/044; G06F 3/0304; G06F 3/03545; G06F 3/0421; G06F 3/0416; G06F 3/0412; G06F 2203/04108; G06F 2203/04106; G02B 7/02
 See application file for complete search history.

(56) References Cited

U.S. PATENT DOCUMENTS

| | | | | |
|---|---|---|---|---|
| 2007/0062852 | A1* | 3/2007 | Zachut | A63F 3/00643 209/683 |
| 2009/0027359 | A1* | 1/2009 | Wong | G06F 3/014 345/179 |
| 2012/0262426 | A1* | 10/2012 | Shi | G06F 3/039 345/179 |
| 2014/0024287 | A1* | 1/2014 | Mineur | A63F 3/00643 446/484 |
| 2014/0145981 | A1* | 5/2014 | Chen | G06F 3/03545 345/173 |
| 2015/0029163 | A1* | 1/2015 | Harris | G06F 3/03545 345/179 |

OTHER PUBLICATIONS

English Translation of Abstract of CN203340157.*
Drawing of CN203340157.*

* cited by examiner

*Primary Examiner* — Hong Zhou
(74) *Attorney, Agent, or Firm* — Michael R. Schacht; Schacht Law Office, Inc.

(57) ABSTRACT

An interactive element for use with an interactive touch screen comprises a conductive body element and a lens. The conductive body element is adapted to interactively engage the interactive touch screen. The lens is supported by the conductive body element. The conductive body element supports the lens relative to the interactive touch screen such that light emitted by the interactive touch screen enters a first portion of the lens and is visible at a second portion of the lens. The conductive body interacts with the interactive touch screen to cause the interactive touch screen to emit light such that light enters the first portion of the lens.

5 Claims, 8 Drawing Sheets

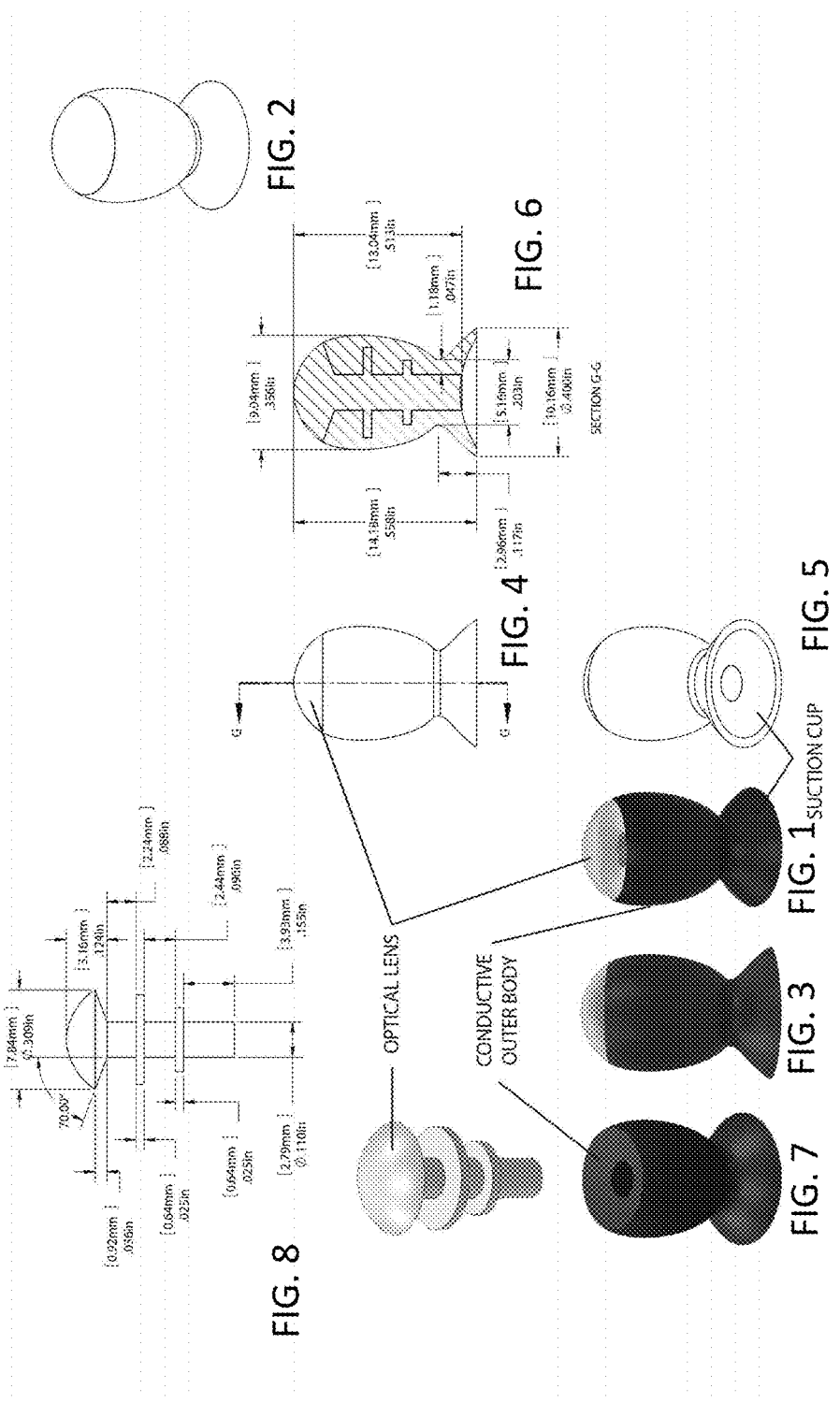

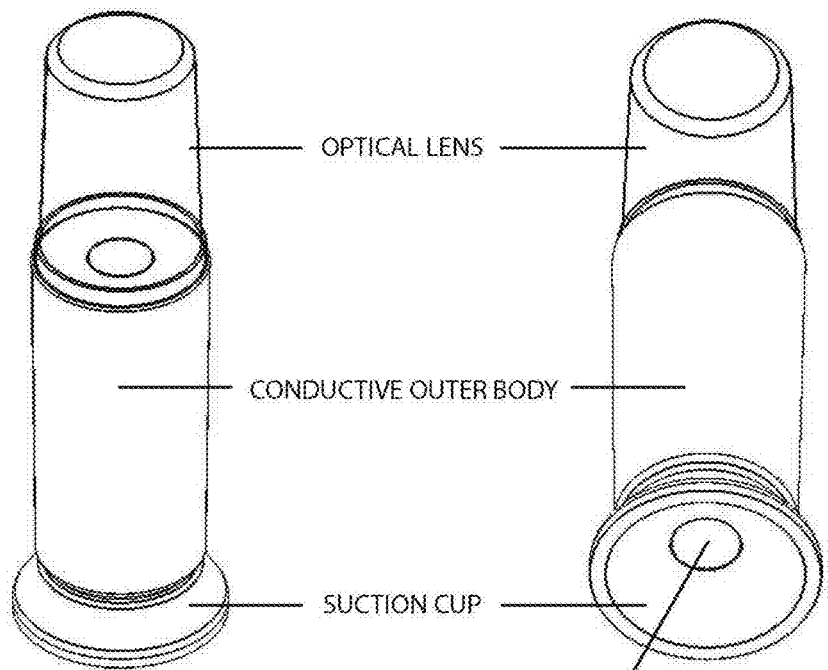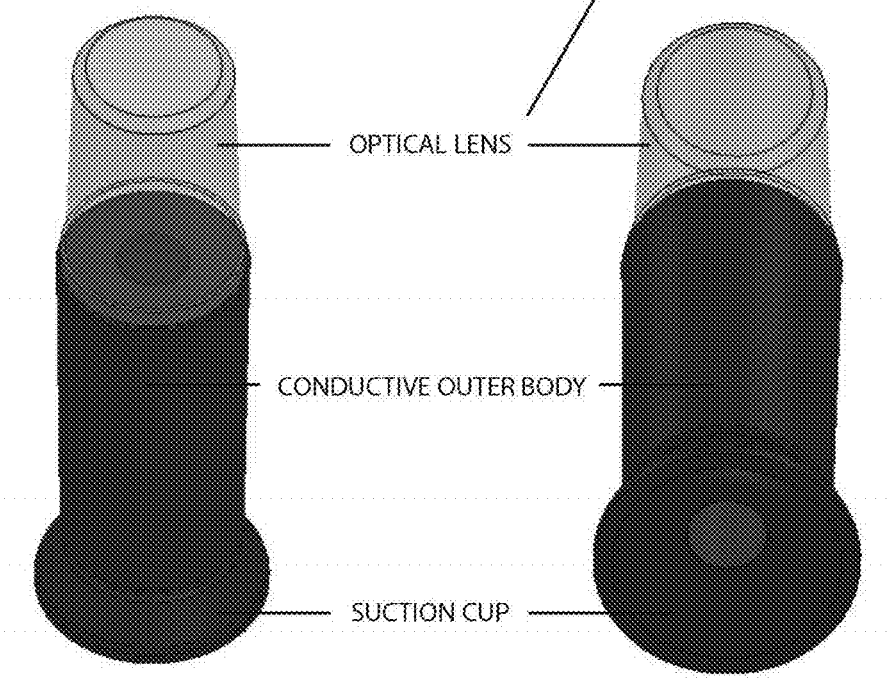
FIG. 9   FIG. 11
FIG. 10   FIG. 12

CONDUCTIVE OPTIC LENS FOR INTERACTION WITH CAPACITIVE TOUCH SCREEN TECHNOLOGY

RELATED APPLICATION

This application, U.S. patent application Ser. No. 15/178,447 filed Jun. 9, 2016, claims benefit of U.S. Provisional Application Ser. No. 62/173,078 filed Jun. 9, 2015, the contents of which are incorporated herein by reference.

TECHNICAL FIELD

The present invention relates generally to interaction with capacitive touch screen technology, and particularly to touch-less interaction with capacitive touch screens by way of conductive enabled light emitting optics and conductive enabled optical lenses.

BACKGROUND

Interactive touch screens allow users to interact directly with a computer generated user interface displayed on a screen using a finger. In addition, a stylus or other device may be used to facilitate user interaction with an interactive touch screen.

Conventionally, the user interface generated by an interactive touch screen is limited to a two dimensional flat surface and light emanating from the two dimensional flat surface. User interface designers have been highly creative in generating and displaying two dimensional images on interactive touch screens with a high degree of realism using techniques such as perspective and 3D rendering.

However, the need exists for systems and methods for expanding the tools available to user interface designers when creating user interfaces for interactive touch screens.

SUMMARY

The present invention may be embodied as an interactive element for use with an interactive touch screen comprises a conductive body element and a lens. The conductive body element is adapted to interactively engage the interactive touch screen. The lens is supported by the conductive body element. The conductive body element supports the lens relative to the interactive touch screen such that light emitted by the interactive touch screen enters a first portion of the lens and is visible at a second portion of the lens. The conductive body interacts with the interactive touch screen to cause the interactive touch screen to emit light such that light enters the first portion of the lens.

DESCRIPTION OF THE DRAWING

FIG. 1 is a top perspective rendering of a first example interactive element of the present invention;

FIG. 2 is a top perspective line art view of the first example interactive element;

FIG. 3 is a side elevation rendering of the first example interactive element;

FIG. 4 is a side elevation line art view of the first example interactive element;

FIG. 5 is a bottom perspective rendering of the first example interactive element;

FIG. 6 is a side elevation, section view illustrating the first example interactive element;

FIG. 7 is a top perspective, exploded rendering of the first example interactive element;

FIG. 8 is a side elevation view of a lens portion of the first example interactive element;

FIG. 9 is a top perspective line art view of a second example interactive element of the present invention;

FIG. 10 is a top perspective rendering of the second example interactive element;

FIG. 11 is a bottom perspective line art view of the second example interactive element;

FIG. 12 is a bottom perspective rendering of the second example interactive element;

DETAILED DESCRIPTION

Figure 13A:
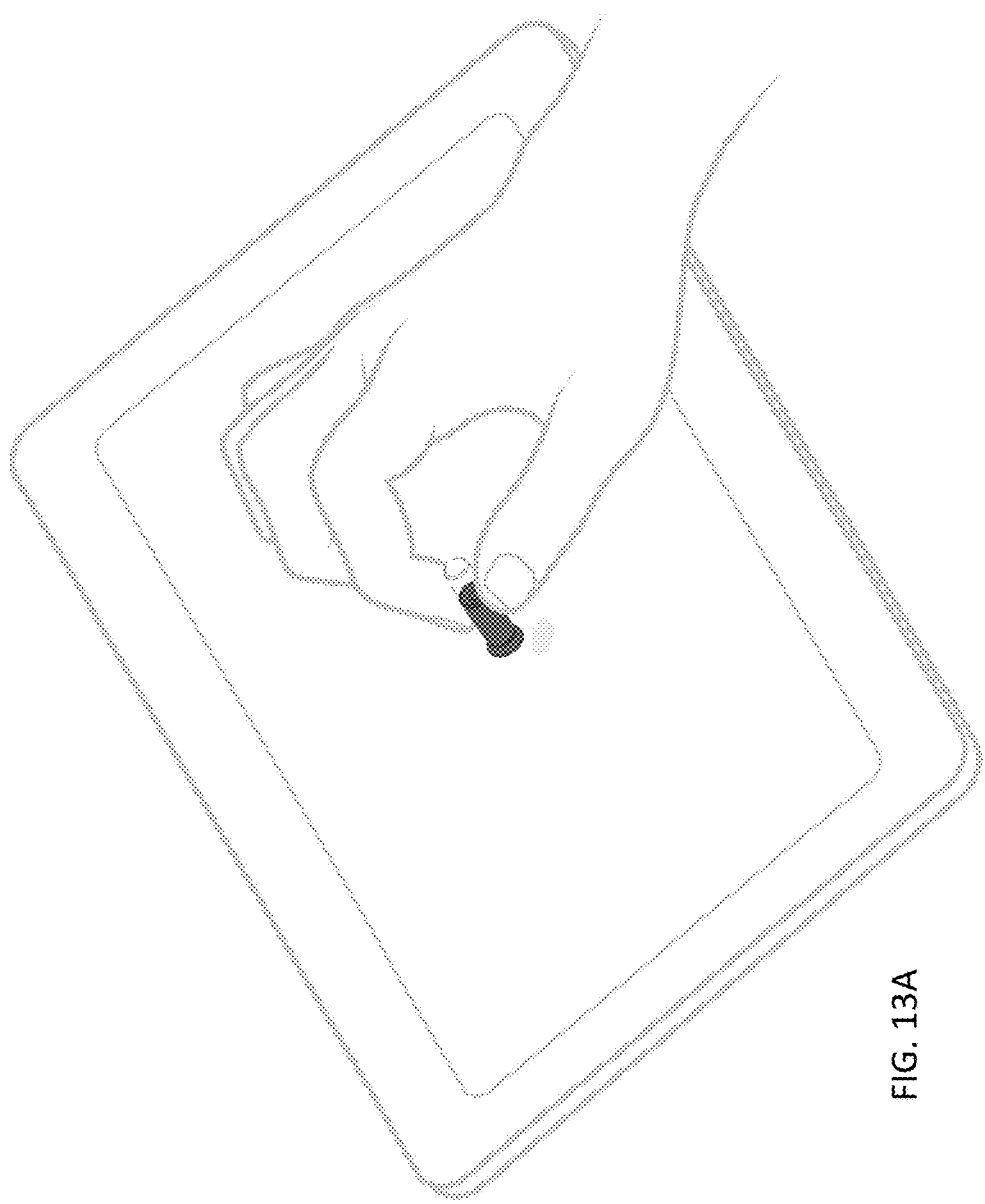
FIGS. 13A and 13B are perspective views of the process of detachably attaching the second example interactive element to an interactive touch screen.
Figure 13B:
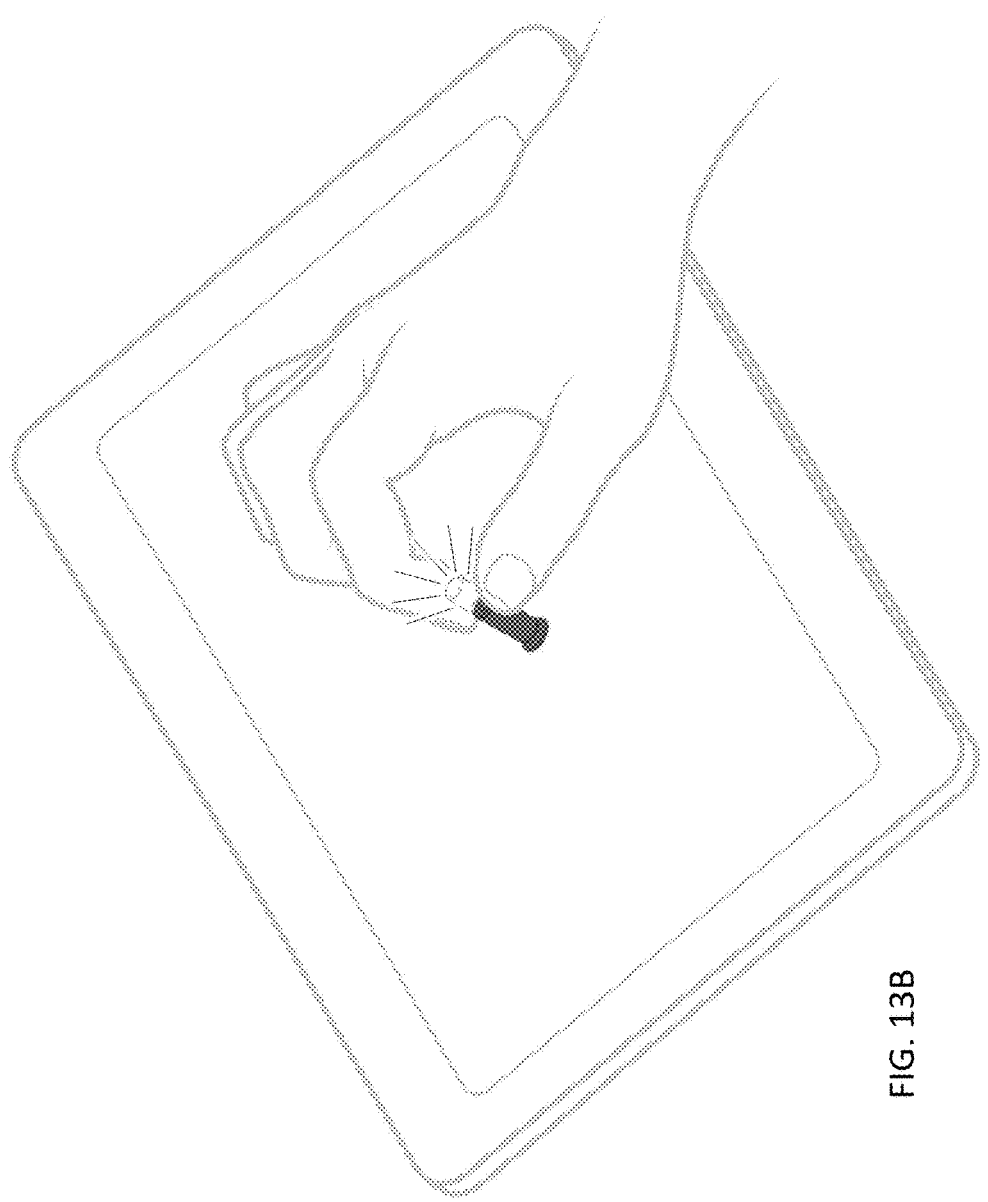

The present invention is a responsive entertainment, educational and gaming device composed of a conductive body component, made from silicone, rubber or rubber-like material and/or plastic and an optical lens and/or light pipe, made from glass, acrylic, plastic or plastic like material. Each individual component is comprised of an optical lens with an affixed and/or surrounding conductive body. The conductive body allows for "touch-less" (i.e. no human contact with the screen to produce a response) interaction with capacitive touch screen displays (i.e. mobile devices, tablets, computer screens, monitors, televisions etc.) whereby a persons touch is transmitted through the conductive body portion of the component and transmitted to the screen, thus activating a response from a capacitive screen, without the human body coming in direct contact with the screen (specific response or results from touch can vary and is a derivative determined through software programming and application/gaming development).

The conductive body is or may be made from a material such as that used to form a passive stylus made for capacitively coupling with an interactive touch screen configured to allow a user to interface with a user interface with one or more fingers. For example, carbon black or other conductive material may be arranged in a matrix of base material. In the example interactive elements described herein, the base material is a resilient material such as rubber or silicone capable of forming a suction to secure the interactive element at a desired location on the interactive touch screen, but the base material may be made of a more rigid material in some situations. Further, while the first and second example interactive elements are passively conductive, it is possible to include electronics within the conductive body to make the interactive elements actively conductive.

One example of such a response is the activation and emittance of light when and where the conductive component makes contact with a capacitive screen, whereby the response of light being emitted from the screen passes through an exposed optical lens near the surface of the screen, causing the lens to "light up" in an on/off fashion. Another example of responsive activation is the visual alteration or changing of viewable content and/or graphical imagery through a conductively encased lens. When the component is in direct contact with both the person and the lens and passes over varying areas of a capacitive screen, the area viewable through the lens in altered for visual, entertainment and education purposes. For example, as ones hand moves the conductive component over the top of a human figure, various layers of human anatomy are exposed and revealed through the lens.

Another unique aspect to the above described components is a variant embodiment whereby the component is designed to be releasably attachable by way of incorporated suction cup in the silicone/rubber body portion the component. This allows the component to stick to a screen or other smooth, non-porous surfaces such as windows, table tops, counters, doors, etc, and be easily pushed on and pulled off.

Figure 14A:
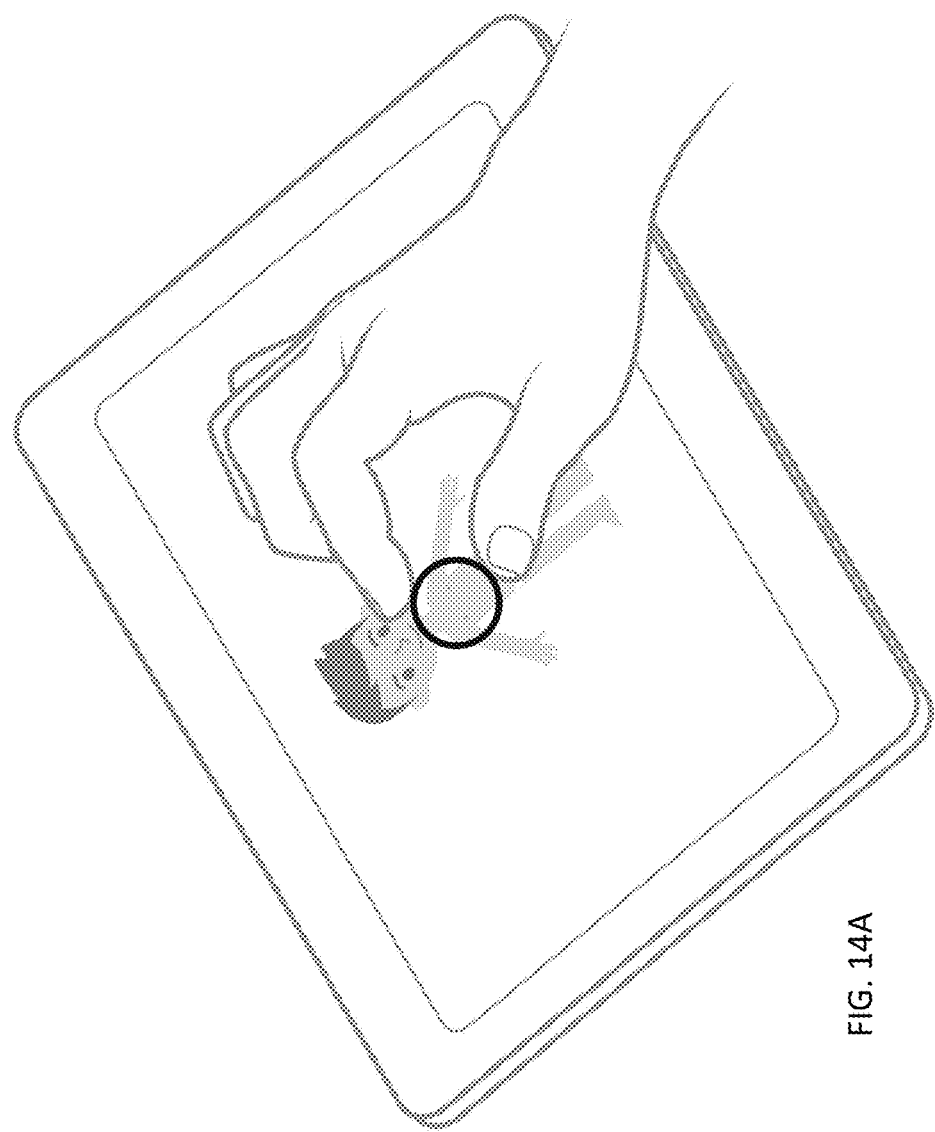
FIGS. 14A and 14B are perspective views illustrating the process of detachably attaching a third example interactive element to an interactive touch screen.
Figure 14B:
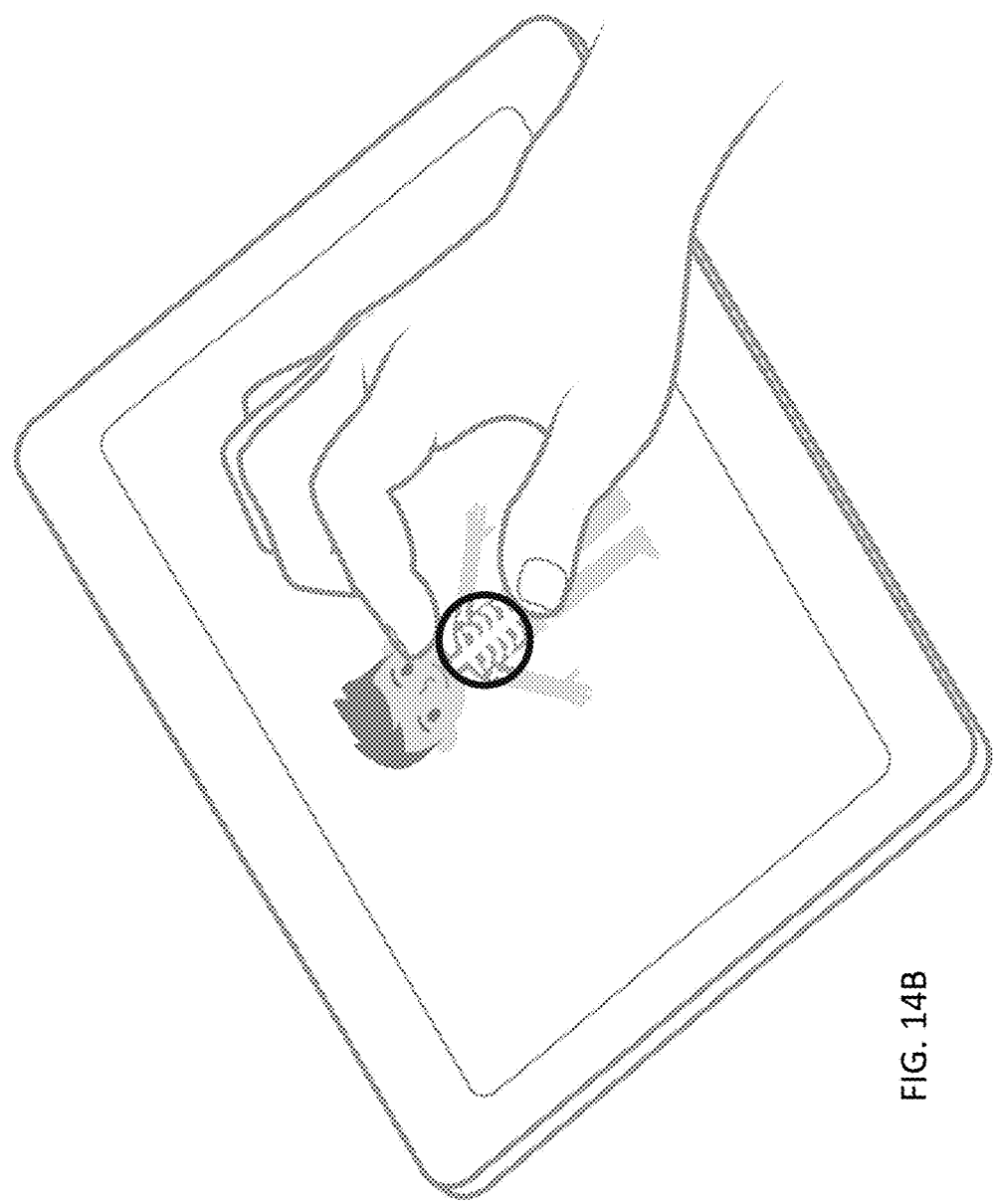
Figure 15:
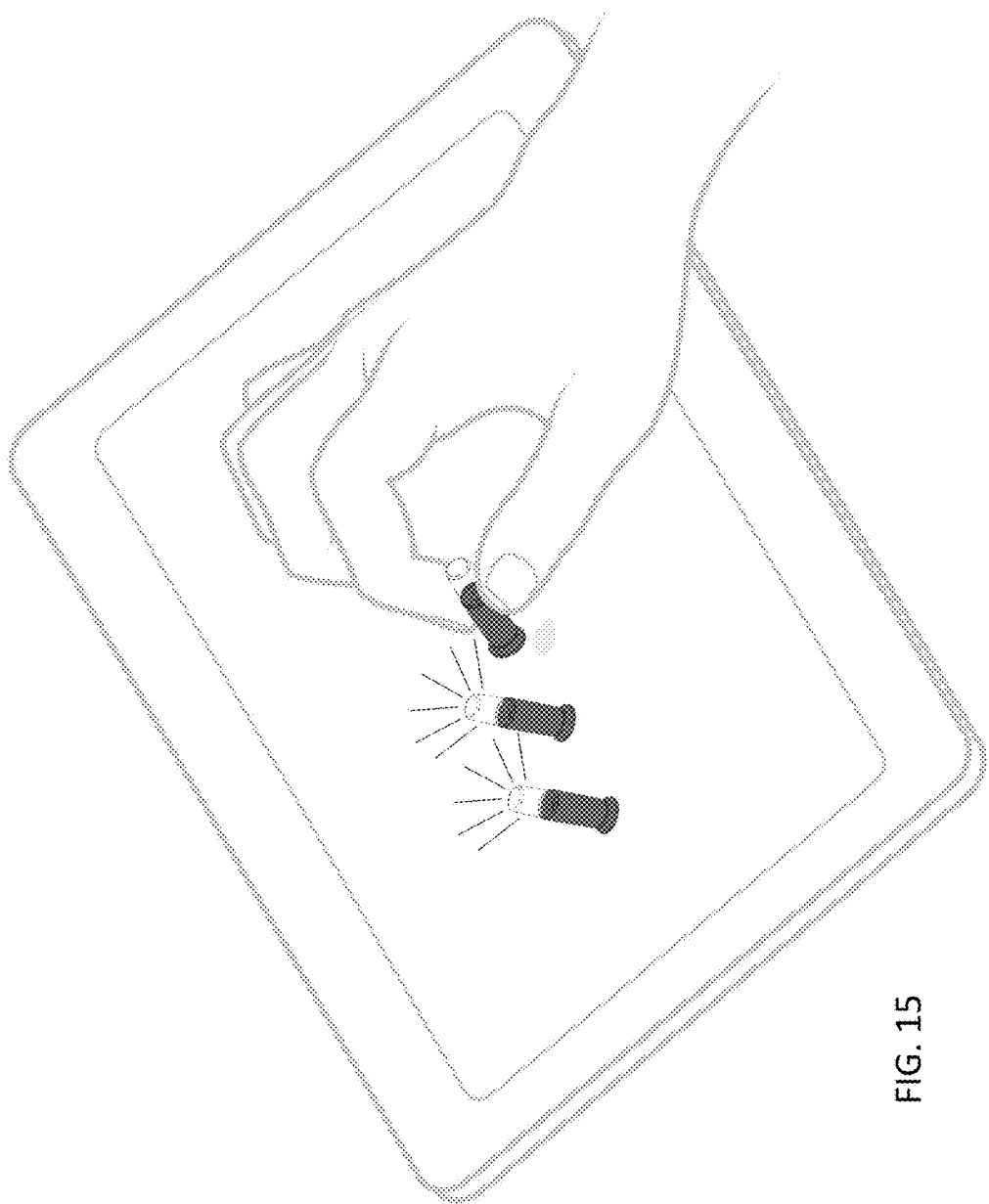
FIG. 15 is a perspective view of the process of detachably attaching multiple instances of the second example interactive element to an interactive touch screen.

A third example interactive element is depicted in FIGS. 14A and 14B. The third example interactive element comprises a base portion and a lens portion. The example based portion of the third example interactive element takes the form of an annular disc. The example lens portion of the third example interactive element is a transparent circular disc. The device used in conjunction with the third example interactive element is configured to generate a first image as shown in FIG. 14A when the base portion is not in contact with the interactive touch screen of the device and a second image that is visible through the lens portion as shown in FIG. 14B when the base portion is in contact with the interactive touch screen of the device.

Figures 16, 17, 18:
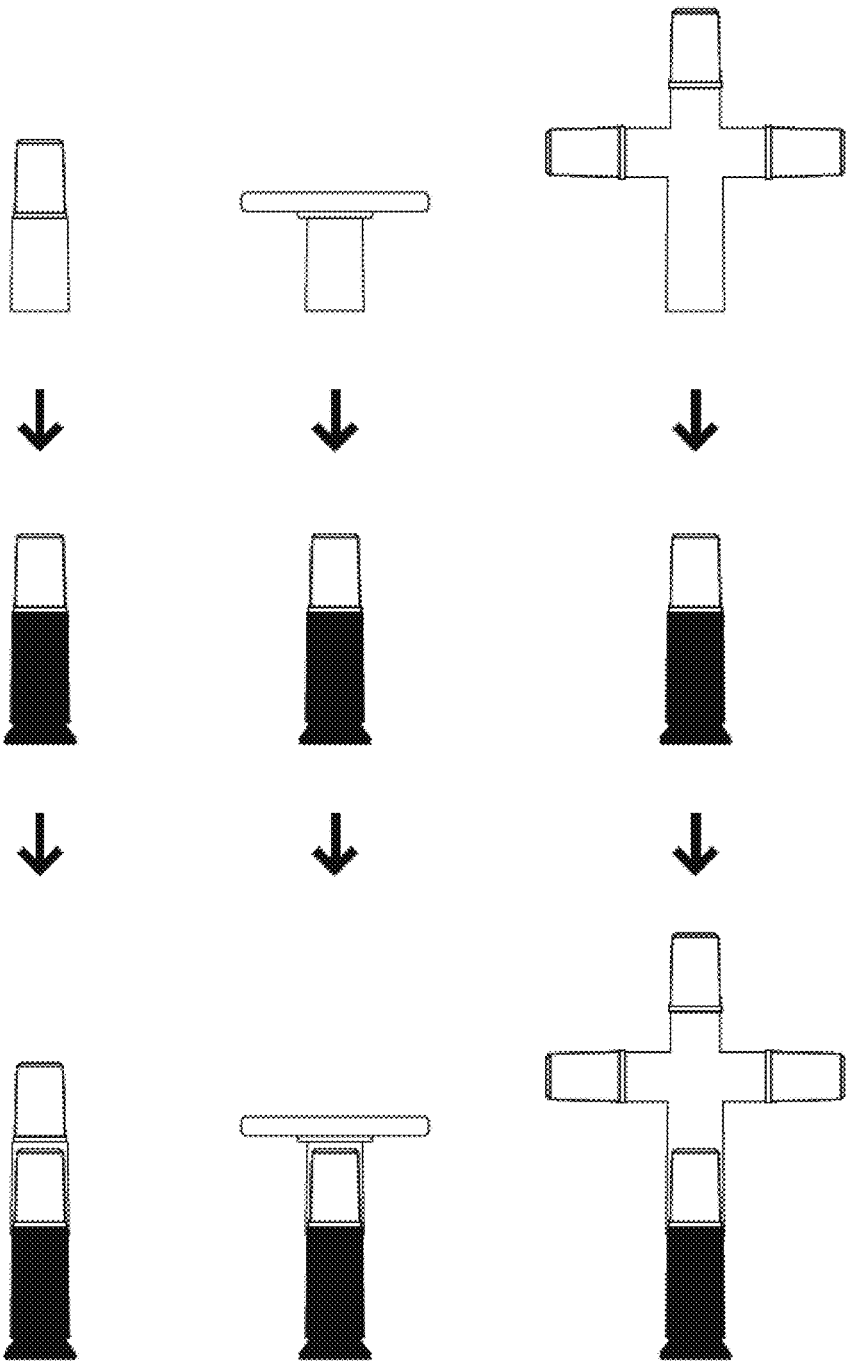
FIG. 16 is a somewhat schematic view illustrating the process of detachably attaching a first example secondary interactive element to the second example interactive element.
FIG. 17 is a somewhat schematic view illustrating the process of detachably attaching a second example secondary interactive element to the second example interactive element.
FIG. 18 is a somewhat schematic view illustrating the process of detachably attaching a third example secondary interactive element to the second example interactive element.

Another unique aspect to the above described components is a variant embodiment whereby the releasably attachable component provides a working foundation for which to affix and attach additional light transmitting parts and pieces to each other in a building or construction like fashion thus producing light that travels up and through the resulting structure. In particular, the interactive elements can be configured such that a first interactive element is supported directly on the capacitive touch screen and a second interactive element is supported on the first interactive element in a stacked configuration. FIGS. 16, 17, and 18 illustrate examples of secondary interactive elements being used, as an example, in a stacked configuration with one of the second example interactive element described above with reference to FIGS. 9-12.

As another example, the conductive body can be configured to have a suction cup portion that directly engages the interactive touch screen and a second stage projection portion (e.g., annular skirt) arranged to be spaced from the interactive touch screen in an unpressed configuration but to engage the interactive touch screen when the inteactive element is deformed by deliberate application of manual force. The use of a second stage projection allows the interactive element to function as a button element.

Several embodiments of the invention have been illustrated. It should be understood that the concepts described in connection with one embodiment of the invention may be combined with the concepts described in connection with another embodiment (or other embodiments) of the invention. It should also be understood that the invention is not limited to the exact construction or method of operation illustrated and described above. Various changes and modifications may be made without departing from the spirit and the scope of the invention.

What is claimed is:

1. An interactive element for use with an interactive touch screen comprising:
   a lens defining a first portion and a second portion;
   a conductive body element defining a first end and a second end, where the first end is adapted to engage the interactive touch screen and the second end is adapted to be spaced from the interactive touch screen when the first end engages the interactive touch screen, the conductive body element comprising
      a suction cup portion forming at least a portion of the first end of the conductive body element; and
      a second stage projection portion forming at least a portion of the second end of the conductive body element; wherein
   the conductive body element supports the lens such that
      the first portion of the lens is exposed at the first end of the conductive body element, and
      the second portion of the lens is exposed at the second end of the conductive body element; wherein
   when the first end of the conductive body element engages the interactive touch screen, the conductive body element supports the lens relative to the interactive touch screen such that light emitted by the interactive touch screen enters the first portion of the lens;
   the conductive body element interacts with the interactive touch screen to cause the interactive touch screen to emit light such that light enters the first portion of the lens and is visible at the second end of the conductive body element; and
   with the interactive element secured to the interactive touch screen by the suction cup portion
      the second stage projection portion is spaced from the interactive touch screen when the interactive element is in an unpressed configuration, and
      the second stage projection portion touches the interactive touch screen when the interactive element is in a pressed configuration.

2. An interactive element as recited in claim 1, in which at least a portion of the first end of the conductive body element is resilient.

3. An interactive element for use with an interactive touch screen comprising:
   a conductive body element adapted to interactively engage the interactive touch screen, the conductive body element comprising
      a suction cup portion, and
      a second stage projection portion; and
   a lens supported by the conductive body element; wherein
   the conductive body element supports the lens relative to the interactive touch screen such that light emitted by the interactive touch screen enters a first portion of the lens and is visible at a second portion of the lens;
   the conductive body element interacts with the interactive touch screen to cause the interactive touch screen to emit light such that light enters the first portion of the lens; and
   with the interactive element secured to the interactive touch screen by the suction cup portion,
      the second stage projection portion is spaced from the interactive touch screen when the interactive element is in an unpressed configuration, and the second stage projection portion touches the interactive touch screen when the interactive element is in a pressed configuration.

4. An interactive element as recited in claim 3, in which the conductive body element is resilient.

5. An interactive element as recited in claim 3, in which the suction cup portion allows the interactive element to be detachably attached to the interactive touch screen.

\* \* \* \* \*